April 26, 1949.　　W. P. MASON　　2,468,301
EFFECTIVE CONTOURING OF PIEZOELECTRIC CRYSTAL ELEMENTS
Filed Oct. 31, 1945　　2 Sheets—Sheet 1

INVENTOR
W. P. MASON
BY
N. D. Ewing
ATTORNEY

April 26, 1949.  W. P. MASON  2,468,301
EFFECTIVE CONTOURING OF PIEZOELECTRIC
CRYSTAL ELEMENTS
Filed Oct. 31, 1945  2 Sheets-Sheet 2

INVENTOR
W. P. MASON
BY
N. D. Ewing
ATTORNEY

Patented Apr. 26, 1949

2,468,301

UNITED STATES PATENT OFFICE 2,468,301

EFFECTIVE CONTOURING OF PIEZOELECTRIC CRYSTAL ELEMENTS

Warren P. Mason, West Orange, N. J., assignor to Bell Telephone Laboratories, Incorporated, New York, N. Y., a corporation of New York Application October 31, 1945, Serial No. 625,897

19 Claims. (Cl. 171—327)

This invention relates in general to piezoelectric crystal elements and to the preparation of such elements as oscillating units.

One object of this invention is to cause piezoelectric crystal elements to oscillate more efficiently.

A second object of this invention is to provide a simpler and less costly process than heretofore known for the preparation of crystals to meet standard specifications.

A more specific object of this invention is to compensate for misgrinding which occurs in the preparation of piezoelectric plates whose principal mode of oscillation is a function of the sheer elastic constant.

An additional specific object of this invention is the activation of shear-mode piezoelectric oscillator plates which because of misgrinding are non-oscillating.

Other objects will be apparent from a study of the specification and claims hereinafter set forth.

The operation of a piezoelectric crystal element in oscillation is critically dependent on its shape and dimensions. Thus, a crystal may be wholly inactive in a principal mode if it is misground by a few microns; or such a crystal may exhibit maximum oscillation activity if one of the faces departs by a few microns from an optically flat condition.

For instance, it has been previously established that quartz oscillator plates or other piezoelectric crystal elements oscillating in a fundamental or harmonic thickness-shear mode tend to exhibit maximum oscillating activity when one or both of their major surfaces are slightly convex. In the case of high harmonic oscillator plates in which the length and width dimensions bear a ratio of three or four hundred to the thickness dimension, the optimum convexity is so slight that for practical purposes the plates are ground substantially flat. However, in the case of oscillator plates in which the length and width dimensions bear a ratio of not more than 30 or 40 to the thickness dimension, it has been the practice during the grinding process to impose a lenticular shape whereby the central portion of the plate assumes a thickness of the order of a few microns greater than that of the periphery. This shaping is achieved during the grinding of a thickness shear mode vibrating plate, such as, for example, BT- or Y-cut quartz, by exerting a turning or rolling motion on the blank while simultaneously exerting pressure on its marginal peripheral edges against an abrading lap, which may be either flat or slightly concave. Accordingly, since the resonant frequency of the crystal is determined by the shear elastic modulus near the center of the plate and by the Young's modulus at the edge (since the edges are free to move), the edge thickness has to be slightly less than the center thickness in order to produce a uniform vibration through the crystal as a whole. This is the condition for greatest activity. Because of the practical difficulties involved in securing an optimum contour by mechanical methods, maximum oscillating activity is rarely secured in the crystals thus processed. It is thus apparent that grinding piezoelectric crystal elements to exactly specified shape and size is difficult and time consuming, and misgrinding results in much loss and less than optimum performance.

According to the present invention, an improved and simplified technique is provided for selectively changing the characteristic of different portions of a piezoelectric crystal element whereby the effective contour is changed without changing the actual physical contour of the element.

The invention utilizes certain forms of radiant energy, including X-rays, to effect a semipermanent change in the elastic properties of the crystalline substance, the degree of change being graduated from one portion to another of the piezoelectric element in a manner depending on how the actual physical contour of the element varies from the desired contour. The treated element is stable and the change is described as a semipermanent one only because of the possibility of cancelling it, in whole or in part, by further treatment of the element in a manner hereinafter to be described. In certain of its ramifications the invention proceeds upon my observation that the radiant energy has a selective effect upon the various elastic moduli of the crystalline substance, the effect being principally if not exclusively directed to the shear modulus, or shear elastic constant. In general, X-irradiation of any particular portion of the element reduces the shear elastic constant applicable thereto and in a sense reduces the natural frequency of vibration.

The present invention, in one of its embodiments, utilizes X-rays in an improved manner for the effective contouring of thickness-shear mode oscillator plates. The crystal element is exposed to an X-ray beam having a pattern of flux distribution such that the density of X-radiation varies over the surface of the element in correlation with a desired effective thickness contour. Upon irradiation in this manner for a given interval, portions of the crystal element which have been exposed to X-radiation of relatively greater intensity than other portions undergo a correspondingly greater reduction in oscillating frequency. Inasmuch as the patterned X-ray irradiation is presumed to differently change the shear elastic constants in different portions of the crystal element, this has the effect of modifying the oscillating characteristics of the crystal element in much the same manner as the actual physical contouring described hereinbefore.

In order to distribute the flux from the X-ray source according to a desired pattern, a thickness-shaped shield comprising a material having a relatively high absorption power for X-rays, is interposed between the X-ray source and the crystal element under irradiation.

The expedient described may be utilized either to improve the oscillating activity of a shear-thickness quartz plate, or to activate hollow-ground crystals which have ceased to oscillate. The X-ray absorption shield to be employed in either case is so shaped that its thickness dimension varies substantially as the difference between the thickness of the crystal element to be irradiated and the desired or optimum thickness contour. According to the present invention in the case of a hollow ground crystal element a suitably shaped field may be provided by making a casting of collodion mixed with Permalloy dust which assumes substantially the shape of the crystal to be contoured. When interposed between the crystal plate under irradiation and the X-ray source, such an absorbing shield modifies the beam of X-rays impinging on the plate so that relatively more radiation falls on those portions whereon it is desired to impose a greater effective oscillating thickness. Thus, a hollow-ground thickness-shear mode oscillator plate may be activated by irradiation for a given interval through a concave shield which allows relatively more radiation to fall on the central portions thereof than on the periphery.

Since the ultimate effective thickness contour imposed upon the crystal element under irradiation is a function within saturation limits of the interval of irradiation as well as the intensity of the radiating beam, a simlar effective thickness contour can be achieved by exposing different parts of the crystal element for different time intervals to an X-ray beam of constant intensity.

Still another method of achieving the same ultimate effective contour is to expose the crystal element under treatment to a uniform beam of X-rays for a given period of irradiation, and follow this by a given period of exposure to an ultraviolet beam having a non-uniform flux pattern. This latter step brings about the desired result by partially removing the effects of X-ray irradiation.

Also a factor in bringing oscillator plates up to full activity or in activating non-oscillating plates, is the suppression of spurious modes that interfere with the principal mode of oscillation. In a crystal cut such as the BT, so dimensioned that low-order flexural modes of oscillation interfere with the principal shear-thickness mode, I have discovered that the coupling between the principal and secondary modes may be reduced by X-ray irradiation. This is possible, since I have discovered that irradiation primarily affects the shear-elastic constant, of which the principal vibrations are a function, while having substantially little effect on the longitudinal elastic constant which is a controlling factor in the low-order flexural modes. A substantial frequency separation is thus brought about between the principal and secondary modes.

Dr. Clifford Frondel has disclosed in an article entitled "Frequency adjustment of quartz oscillator plates," which appears on page 31 of the Radio Engineer's Digest, vol. 1, No. 3, October 1944, that he has reduced the frequency of certain quartz oscillator plates by irradiation with X-rays for a designated interval. Such procedure, broadly, is not claimed herein.

As used in the specification and claims hereinafter, the "activity" of a crystal element relates to the amplitude of its piezoelectric vibrations. The activity of a given crystal element as part of the circuit of a given oscillator, may be measured in terms of "performance index," the latter term being defined as the antiresonant impedance of the crystal in parallel with the capacitance of the oscillator at the oscillating frequency. Performance index has the dimension of ohms.

For the purposes of this specification, the principal mode of oscillation for a given crystal cut may be defined as that mode which exhibits the greatest separation between the resonant and antiresonant frequencies.

The techniques and apparatus of the present invention will be described in detail with reference to the accompanying drawings.

Figs. 1A and 1B show a quartz crystal molecule in stress along the X and Y axes, respectively, while

Figure 2A:
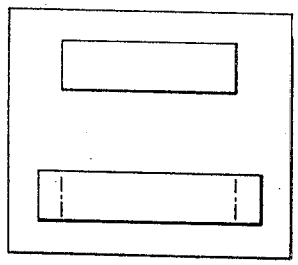
Figs. 2A to 2E show a piezoelectric crystal element in each of various modes of oscillation.
Figure 2B:
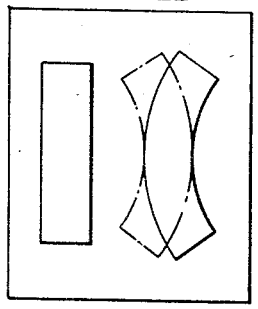
Figure 2C:
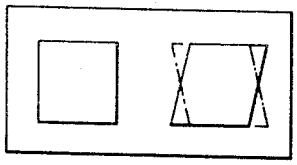
Figure 2E:
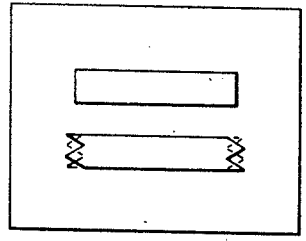
Figure 2D:
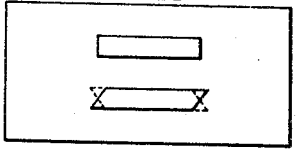

Fig. 2A, element vibrating in a fundamental longitudinal mode;

Fig. 2B, element vibrating in a fundamental flexural mode;

Fig. 2C, element vibrating in a fundamental face-shear mode;

Fig. 2D, element vibrating in a fundamental thickness-shear mode; and

Figure 4:
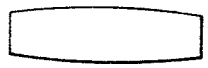
Figure 3:
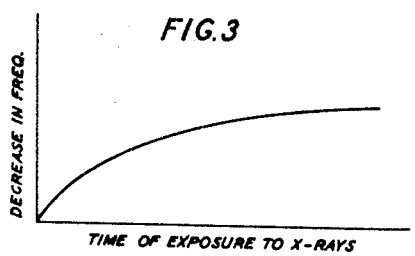
Figure 5:
Figure 6:
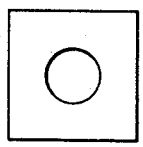
Figure 8:
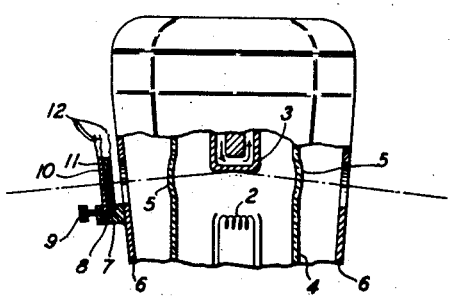
Figure 9:
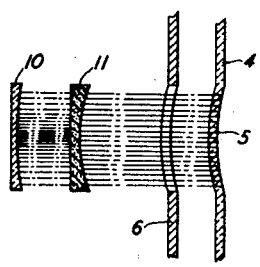
Figure 10:
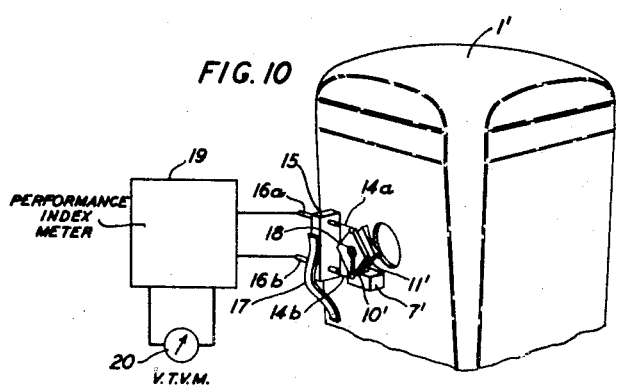

Fig. 2E, element vibrating in a harmonic thickness-shear mode;

Fig. 3 shows the relationship between exposure time of a crystal element under irradiation and decrease in frequency;

Fig. 4 shows an enlarged view of the cross-section of a physically contoured crystal element;

Fig. 5 shows a cross-sectional view of a double concave X-ray absorbing shield, constructed according to the techniques of the present invention;

Fig. 6 shows a lead shield of uniform cross-section, in which a circular hole has been cut in the center;

Figs. 7A, 7B, 7C, and 7D depict the process of casting an X-ray absorbing shield of collodion mixed with Permalloy dust;

Fig. 8 shows a hollow-ground quartz oscillator plate under X-ray irradiation through a contouring shield in accordance with the technique of the present invention;

Fig. 9 shows an exploded, diagrammatic view of the crystal and shield assembly of Fig. 8; and Fig. 10 shows a hollow-ground quartz oscillator plate connected as an element of the oscillating circuit of a performance index meter, during irradiation in accordance with the technique of the present invention.

Figure 1A:
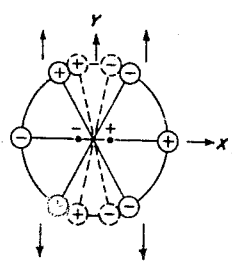
Figure 1B:
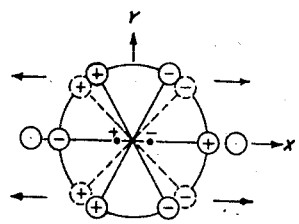
Figure 1C:
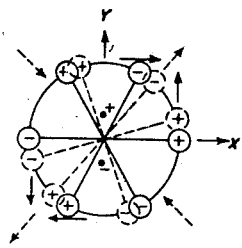
Fig. 1C shows the molecule in shear-stress.

Figs. 1A, 1B, and 1C show diagrammatically how charges develop on quartz crystal elements under longitudinal stresses applied in either an X or Y direction, or under shearing stress. In the aforementioned diagrams, silicon atoms are each designated by a plus sign, while each of the double atoms of oxygen is designated by a minus sign. The directions of the X, electrical axis, and the Y, mechanical axis, are as indicated in the diagrams, while the Z or optic axis, may be assumed to have a positive direction perpendicular to the plane of the page. It is seen from the threefold symmetry of the quartz molecules about their Z axes that whenever the X and Y axes are rotated through an angle of 120 degrees their coordinate relationships to the charge distributions within the molecules are found to be the same, whereupon each quartz crystal may be said to have three electrical and three mechanical axes, which are collectively called its crystalographic axes. For convenience, only one pair of these axes is shown.

When extensional or compressional stresses are applied along the Y or mechanical axis, a separation of the centers of gravity of the positively and negatively charged particles occurs along the X axis, as shown in Fig. 1A. Extensional or compressional stresses applied parallel to the X axis, as shown in Fig. 1B, also cause a separation of charges along the X axis, but in a reverse direction to that shown in Fig. 1A. Conversely, a voltage applied along the X axis may produce corresponding mechanical stresses along either the X or Y axis, depending on the cut of the crystal.

In addition, stresses applied in such a manner that they may be resolved in the X—Y plane into an extensional stress along one 45-degree axis of the crystal molecule and a compressional stress along the other 45-degree axis, may be defined as shear stresses, and bring about a separation of charges along the Y axis, as shown in Fig. 1C. Conversely, a potential difference applied along the Y or mechanical crystal axis causes the crystal molecules to be stressed in shear.

As used hereinafter, the term "longitudinal mode" refers to that type of oscillation in which expansion and contraction take place in the direction of travel of the compressional wave through the crystal element. This type of motion, illustrated in Fig. 2A, involves only the longitudinal elastic constants of the crystal and is substantially independent of the shear elastic constant.

The term "flexural mode" refers to oscillations of a transverse type in which the wave motion travels in a direction at right angles to the particle displacement. This type motion is illustrated in Fig. 2B. Oscillation frequency in the low order flexural modes is primarily a function of the longitudinal elastic content.

The term "shear mode" refers to oscillations involving expansion and contraction in opposite phase along diagonals of either the face or the thickness of a crystal element. Figs. 2C and 2D show elements oscillating in fundamental face-shear and thickness-shear modes, respectively; while Fig. 2E shows an element oscillating in harmonic thickness-shear. Oscillation frequency in this type of motion is a function of the shear elastic constant.

It is with crystal elements whose principal mode of oscillation is in fundamental or harmonic thickness-shear that the discussion hereinafter is chiefly concerned.

In order to increase the oscillating activity of crystal elements vibrating in thickness-shear in which the length and width dimensions are not more than thirty or forty times the thickness dimensions, it has been the prior practice, as described hereinbefore, to impose on such crystals a lenticular shape such that the central portions are of the order of a few microns thicker than the peripheral portions. Such physical shaping is known in the art as "contouring." An exaggerated cross-section of a contoured crystal is shown in Fig. 4.

As hereinbefore mentioned, it has been previously disclosed that the frequency of certain quartz oscillator plates is lowered by irradiation with X-rays and certain other types of radiation, such as gamma rays, alpha particles, electrons and deuterons. As shown in Fig. 3, decrease in frequency in a piezoelectric element irradiated has been found to be proportional to the exposure time up to a saturation point. The frequency decrease brought about by irradiation can be removed by heating the crystal above 170 degrees for a long period of time. Below 170 degrees, heat applied for any length of time has no effect. Strong ultra-violet light will also remove the frequency lowering and clear the crystals of any color change brought about by irradiation.

According to one theory, the action of X-rays and other types of radiation in changing the elastic constants of crystals is accountable as follows. The absorption of X-ray quanta by the silicon atoms causes the emission of photoelectrons therefrom. Because of imperfections in the structure of a natural crystal, certain positive ion "traps" exist which readily absorb the emitted photoelectrons, thereby bringing about a change in the elastic bonding forces existing between respective atoms in the crystal molecules. Crystals may be restored to their initial elastic states by heating, since a temperature rise increases the velocity of the captured electrons, thereby permitting them to escape from the positive "traps" and return to their normal positions in the silicon orbits, thereby restoring the initial intermolecular bonds. It has been my discovery that X-ray irradiation, while appreciably changing the shear elastic constants of piezoelectric crystals processed, is substantially ineffective in changing the longitudinal elastic constants thereof.

I have discovered it possible to increase the oscillating activity of any shear-mode vibrating crystals known in the art, such as the AT, BT or Y-cut quartz, and also to activate hollow-ground crystals of the aforementioned type by a particular technique of irradiation with X-rays, or other classes of radiation, the details of which I shall now disclose. The desired end is achieved by changing the effective (although not the actual) thickness contour of shear-mode crystals by differently modifying the shear elastic constants of different parts of such crystals with respect to one another according to a predetermined pattern of irradiation. For example, the effect on a hollow-ground crystal element as an oscillating unit of reducing the shear elastic constant in the central regions of the crystal element with respect to the shear elastic constant of the peripheral regions is substantially the same as achieved by actually reducing the physical thickness of the peripheral regions with respect to that of the central regions in a crystal element having a constant shear modulus.

In order to modify the flux pattern of the irradiating X-ray beam so as to change the oscillating characteristics of a crystal element in accordance with these theories, shields were designed to be interposed between the crystal element and the X-ray source which exhibited varying degrees of opacity to the passage of X-rays therethrough. As shown in Fig. 6 one type of shield used comprises merely a rectangular lead plate with substantially the same face dimensions as the crystal element to be processed and having a circular hole in the central portions. Irradiation with a shield of this type proved ineffective, since too great a discontinuity was thereby produced between the elastic characteristics of those portions of the crystal element irradiated through the hole, and of those portions falling under the opaque part of the shield. Experiments were tried also in which several rectangular lead shields were placed concentrically on the irradiated crystal element, each shield having a successively larger hole than the one placed above it. This device was also unsuccessful in producing the necessary fineness of gradation in the elastic constants of the crystal element to bring about oscillation in a hollow-ground crystal plate, or otherwise change the oscillating characteristics of a treated crystal element.

In the preferred form the shield is constructed in such a manner that the density of X-radiation falling on the surface of, for example, a hollow-ground crystal element to be processed decreases substantially continuously or uniformly from a maximum on the central portions of the surface to a minimum on the peripheral portions of the surface.

In accordance with the present invention, shields fulfilling the above specification may be constructed by means of a number of different techniques and employing any of a number of different suitable materials which may be shaped with facility and which have the requisite absorbing power for X-radiation passing therethrough.

In the preparation of shields which may be molded to any desired shape for experimental purposes, a plastic clay mixed with an oily medium to prevent hardening was found to serve as a suitable matrix in which to uniformly distribute the powdered lead which acts as the X-ray absorbing agent. The lead powder is worked into the clay by hand until the mixture assumes a uniform color. After being shaped to rectangular length and width dimensions substantially the same as the hollow-ground crystal to be processed, the shield is slightly hollowed in the center, giving it a substantially double-concave shape which is shown in exaggerated cross-section in Fig. 5. A photograph of short exposure is then taken of an X-ray beam which has passed through the so-prepared shield, in order to determine whether the lead powder is properly distributed and the shield so shaped as to permit the radiation flux to decrease uniformly from a maximum transmitted by the central portions to a minimum transmitted by the peripheral portions.

Since the shield described in the foregoing paragraph does not harden into a rigid shape, it is a convenient form for certain uses in which it is desired to change the shape of the shield in accordance with the crystal element to be processed, or in order to achieve different contouring effects.

A type more suitable for general usage comprises a shield formed from powders of lead and Bakelite (phenol-formaldehyde resin) mixed in proportions determined experimentally, and hardened into a blank, from which the desired concave shape is machined on a lathe.

Figure 7A:
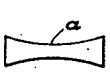
Figure 7B:
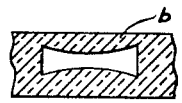
Figure 7C:
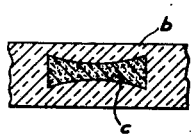
Figure 7D:

Still another method of preparing an X-ray absorbing shield according to the present invention may be understood with reference to Figs. 7A, 7B, 7C and 7D of the drawings. A mold of the crystal element to be contoured, which may be the hollow ground plate $a$ of Fig. 7A, is prepared from collodion or other suitable material, as shown in Fig. 7B. The plate $a$ is removed, leaving the collodion mold $b$, into which is poured a uniform mixture of collodion and Permalloy dust, as shown in Fig. 7C. When the mold $b$ is removed, the casting $c$ of Fig. 7D results. A shield thus formed has the advantage that it is so shaped as to modify the irradiating X-ray beam so to exactly compensate for the irregularities in thickness of the crystal element processed.

The method and apparatus employed in the irradiation of piezoelectric oscillator plates with X-rays, either to activate non-oscillating plates, or to improve the effective thickness contour of active plates, will now be described with reference to Figs. 8 and 9 of the drawings.

Fig. 8 shows the crystal oscillator plate to be processed together with its contouring shield positioned before the irradiating X-ray machine; while Fig. 9 shows an exploded diagrammatic view of the shield and crystal assembly during irradiation.

Assume that the hollow-ground quartz oscillator plate 10, initially dimensioned to oscillate in the shear-thickness mode, is to be activated according to the technique of the present invention. The following equipment is required for the process.

The X-ray machine 1 may be of any type conventionally employed for X-ray diffraction purposes. The tungsten filament 2 of the model here employed is operated for the purposes of irradiation at a current of 25 milliamperes and a peak full-wave rectified voltage of 60 kilovolts, which is supplied from a conventional two-valve generator (not shown). For the purposes of the present invention, it has been found expedient to employ a copper anode target 3 which produces a characteristic X-radiation having a maximum wavelength of 1.5374 angstroms. The target 10 and the high voltage generator are water-cooled by means of a conventional pumping system (not shown).

The conventional X-ray tube 4 which serves as a housing for the filament 2 and the copper anode 3 is supplied with four windows 5, which comprise some material transparent to the relatively soft X-rays from the copper target, and which are so positioned that the emerging X-ray beam makes a small angle with the horizontal. The outer housing for the X-ray tube 4 is a ray-proof leaded-bronze structure 6 in which four parts positioned to correspond to the tube windows 5, are set at such an angle from the vertical that the X-ray beam emerges at right angles to the wall of the housing.

A bracket 7 attached at right angles to the leaded-bronze housing 6 in front of one of the four ports thereof contains a slot 8 about 1½ centimeters from the housing wall, the size of the slot opening being adjustable by means of the set-screw 9.

The X-ray absorbing shield 11, which is assembled with the hollow-ground crystal plate 10 in the slot 8, may be constructed according to any of the techniques hereinbefore described, and of any of the materials hereinbefore mentioned, for example, leaded Bakelite. The ultimate shape of the absorbing shield is a function of a number of variables, namely, the quantity of lead or other X-ray absorbing agent mixed with the matrix material, the time of exposure to the irradiating X-ray beam, the intensity of the thereto, and the effective contour which it is desired to impose on the treated plate. A typical shield has the same face dimensions as the treated crystal plate (about 1 centimeter square) and a thickness dimension which decreases gradually from about 1½ millimeters in the peripheral portions to about ⅓ of a millimeter at the center.

The cellophane layers 12, which are substantially transparent to X-rays, serve as protective coverings for the crystal plate under irradiation and also for the crystal and shield assembly.

The following steps are included in the process of effectively contouring the hollow-ground quartz oscillator plate 10 by X-ray irradiation.

The quartz oscillator plate 10 to be processed is first scrubbed with a soap solution in order to remove loose particles which remain from the lapping process, and also deposits of grease and soot, all of which affect the ultimate frequency of oscillation.

The cleansed plate 10, after being encased in the cellophane envelope 12 in order to protect the surface from dirt and grease, is then placed in contact with the absorbing shield 11, so that the hollowed face of the crystal plate 10 is held against the face of least curvature of the shield 11. The crystal and shield is then placed in an additional envelope of cellophane 12, after which it is fixed in position in the slot 8 by means of the set-screw 9 so as to be substantially perpendicular to the irradiating X-ray beam, and so that the shield 11 is interposed between the window of the X-ray machine 1 and the hollow-ground plate 10.

Irradiation of the hollow-ground crystal plate 10, positioned as above described, is carried on for some convenient interval, such as an hour, after which it is removed from the irradiation apparatus for measurement of its performance index. Suitable methods and apparatus for making this measurement are described by C. M. Harrison in an article entitled "Performance index of quartz plates" appearing on page 217 of the Bell System Technical Journal, volume XXIV, No. 2, April 1945.

After the measurement, the crystal and shield assembly are repositioned in the apparatus for continued irradiation. At convenient intervals, the crystal plate is removed for retest of its performance index, irradiation being continued until the performance index ceases to increase in value, or actually shows a slight decrease. Further irradiation after the performance index has reached a maximum value has the effect of "over-contouring" the crystal element and decreasing its oscillating activity.

In experiments in which a BT-cut crystal ground 3½ microns thinner in the center than on the periphery was irradiated through a concave shield of leaded plastic clay, the performance index measured 75 ohms after one hour of irradiation, 105 after the second hour of irradiation, and 95 after the third hour of irradiation, indicating that irradiation for more than two hours processed the crystal element beyond its optimum effective contour.

Although the above irradiation technique has been described as applied to a hollow-ground oscillator plate, it is to be understood that a similar procedure may be employed in imposing a desired effective thickness contour on any type of shear-mode oscillating piezoelectric crystal element.

In effectively contouring crystal elements as hereinbefore described, the necessity for constantly removing the treated element from the irradiation apparatus to test its performance index may be eliminated by oscillating the crystal during irradiation in an apparatus such as shown in Fig. 10 of the drawings.

Referring to Fig. 10, the X-ray machine 1' is similar to the X-ray machine 1 described with reference to Fig. 8. The hollow-ground crystal plate 10', under irradiation, is held in position at right angles to the X-ray beam, at a distance of about 1½ centimeters in front of one of the four ports of the X-ray machine 1' by means of the conducting wires 14a and 14b attached to its corners.

The X-ray absorbing shield 11', which may be of any of the types hereinbefore described, is held in contact with the crystal plate 10' by means of the bracket 7' attached at right angles to the outer wall of the X-ray machine 1'. Evaporated gold electrodes 18 on each side of the crystal plate 10' are connected, one to the lead wire 14a and the other to the lead wire 14b, which are passed through the wooden block 15 and connected to their respective terminals 16a and 16b. The wooden block 15 is held in position against the wall of the X-ray machine by means of the metal bracket 17.

The circuit of the performance index meter 19, which is connected to the terminal 16a and 16b, is arranged so that the crystal element 10' is positioned as the test element in the circuit shown by C. W. Harrison in Fig. 15.4, page 224, and described by him in the hereinbefore mentioned article entitled "Performance index of quartz plates." A vacuum-tube voltmeter 20 connected across the output of the meter 19 is calibrated to read in terms of performance index.

The crystal element 10' is irradiated by means of the X-ray machine 1' through the absorbing shield 11' as described hereinbefore, being connected during the irradiation process to the circuit of the performance index meter 19, so that any increase in performance index may be read directly from the vacuum-tube voltmeter 20. When the performance index ceases to rise, the crystal element is removed from the irradiation apparatus as having the optimum effective thickness contour.

Although the technique of the present invention for imposing an optimum effective thickness contour on piezoelectric crystal elements has been described as adapted to quartz oscillator plates vibrating in a shear-thickness mode of oscillation, it is not limited thereto, and may be applied to other types of piezoelectric crystal elements vibrating in other modes of oscillation. And although X-rays have been found the most practical type of radiation for the purposes of this invention, it is contemplated that other types of radiation such as gamma rays, alpha particles, electrons or deuterons may alternatively be used to constitute the irradiating beam.

What is claimed is:

1. A method for controlling the oscillating activity of a piezoelectric crystal element which comprises exposing said element to radiation for a predetermined interval in such a manner that the total radiation received on different portions of said element during said interval decreases substantially uniformly from the maximum on some of said portions to a minimum on other of said portions.

2. A method for controlling the oscillating activity of a piezoelectric crystal element which comprises exposing said crystal element to radient energy having a predetermined pattern of intensity on the different portions of said element, said energy intensity decreasing substantially uniformly from a maximum on certain of said portions to a minimum on certain other of said portions.

3. A method for controlling the oscillating activity of a piezoelectric crystal element which comprises exposing said element to radiation for a predetermined interval in such a manner that the total radiation received during said interval at any given point on the surface of said element is substantially an inverse function of the difference between the dimension of said element in a direction substantially perpendicular to the surface of said element at said point and the optimum dimension for said cystal element at said point.

4. A method for controlling the oscillating activity of a hollow-ground piezoelectric crystal element which comprises exposing said element to radiation which varies in intensity over the surface of said element substantially as an inverse function of the dimension of said element in a direction substantially perpendicular to said surface.

5. A method for controlling the oscillating activity of a piezoelectric crystal element which comprises exposing said crystal element to a beam of X-rays having a predetermined pattern of intensity on the different portions of said element, said energy intensity decreasing substantially uniformly from a maximum on certain of said portions to a minimum on certain other of said portions.

6. A method for controlling the oscillating activity of a piezoelectric oscillator plate of non-uniform thickness which comprises exposing said plate to X-radiation which varies in intensity over the surface thereof substantially as an inverse function of the thickness of said plate.

7. A method for activating a hollow-ground piezoelectric oscillator plate which comprises exposing said plate to directed radiation having a predetermined flux pattern.

8. A method for effectively changing the thickness contour of a piezoelectric crystal element which comprises modifying a beam from a source of X-radiation so that the radiant flux passing through a cross-sectional plane perpendicular to the direction of said beam varies uniformly from a maximum at certain points in said plane to a minimum at certain other points in said plane and exposing a surface of said piezoelectric crystal element to the so modified beam of X-radiation for a predetermined period.

9. A device which comprises a source of directed radiation, a piezoelectric crystal element in the path of said radiation, and means interposed between said source and said element to vary the intensity pattern of said radiation in accordance with variations of the dimension of said crystal element in the direction of said source.

10. An apparatus for controlling the oscillating activity of a piezoelectric oscillator plate which comprises a source of a beam of X-radiation directed to impinge on said plate, and a shield interposed between said source and said plate, said shield comprising a material having a relatively high absorbing power for X-rays, and said shield having a dimension in the direction of said beam which decreases substantially uniformly from a maximum in certain portions to a minimum in certain other portions.

11. An apparatus for controlling the oscillating activity of a piezoelectric oscillator plate which comprises a source of a beam of X-radiation directed to impinge on said plate, and a shield interposed between said source and said plate, said shield comprising a material having a relatively high absorbing power for X-rays, and said shield having a thickness dimension which varies substantially as a function of the thickness dimension of said oscillator plate.

12. Apparatus for controlling the oscillating activity of a quartz oscillator plate which comprises a source of a beam of X-radiation directed to impinge on said plate, and a shield interposed between said source and said plate, said shield comprising a substantially homogeneous mixture of a matrix material and a finely divided material having a relatively high absorbing power for X-rays, and said shield having a thickness dimension which increases substantially uniformly from a minimum value in the central portions of said shield to a maximum value at the peripheral portions of said shield.

13. A piezoelectric crystal element in which the shear elastic constant decreases substantially uniformly from a maximum value in certain portions of said element to a minimum value in certain other portions of said element.

14. A piezoelectric crystal element in which the shear modulus varies substantially continuously from one point to another in a plane having a fixed angular relationship to the crystallographic axes of said crystal.

15. A piezoelectric oscillator plate having a pair of approximately parallel major surfaces and having a principal mode that involves the shear modulus, the contour of said surfaces departing from the optimum contour for maximum activity of a plate having a uniform shear modulus, and the shear modulus varying from one point to another in said plate in correlation with the departure of the contour of said surfaces from said optimum contour.

16. The method of treating a piezoelectric oscillation element which comprises exposing said element to a form of radiation having a semi-permanent effect on the shear modulus of the material comprising the element, and grading the change in shear modulus substantially continuously from one point to another of the element.

17. The method of treating a piezoelectric oscillation element which comprises exposing said element to a form of radiation having a semi-permanent effect on the shear modulus of the material comprising the element, and subsequently exposing said element to ultra-violet light to partially remove the said effect on the shear modulus, the exposure to said ultra-violet light varying from one point to another so that the residual change in said shear modulus is graded substantially continuously from one point to another of said element.

18. A treated piezoelectric crystal element vibratory in resonance in a mode of vibration involving shear, the dimensions of said element precluding resonant vibration in said mode in the natural untreated state of said element.

19. As an article of manufacture, a piezoelectric crystal element that is hollow ground but that is nevertheless vibratory in resonance in a principal mode of vibration involving the shear modulus, said mode of vibration being extinguishable by exposure of said element to ultra-violet light.

WARREN P. MASON.

REFERENCES CITED

The following references are of record in the file of this patent:

UNITED STATES PATENTS

| Number | Name | Date |
| --- | --- | --- |
| 2,218,225 | Willard | Oct. 15, 1940 |
| 2,437,914 | Frondel | Mar. 16, 1948 |

OTHER REFERENCES

Sproull, X-Rays in Practice, page 293, 34 B Electronics, vol. 17, page 227 (December 1944).